Oct. 15, 1963 D. S. TOFFOLO 3,107,325
REGULATED TRANSFORMER RECTIFIER POWER SUPPLY
Filed June 29, 1962 6 Sheets-Sheet 1
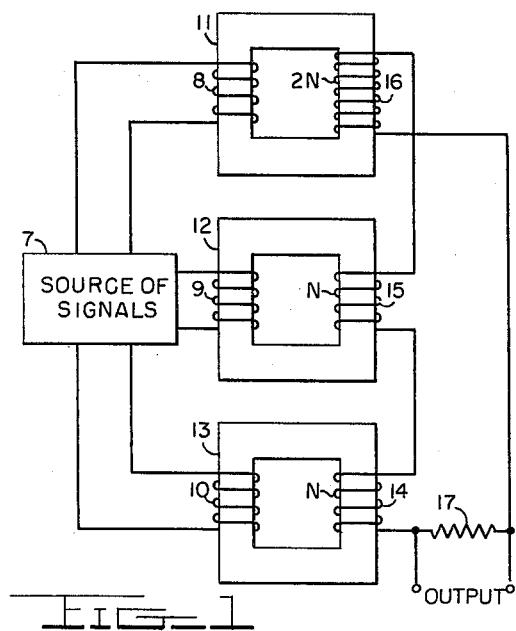
FIG-1
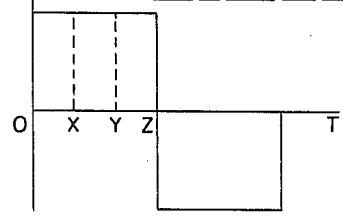
FIG-3
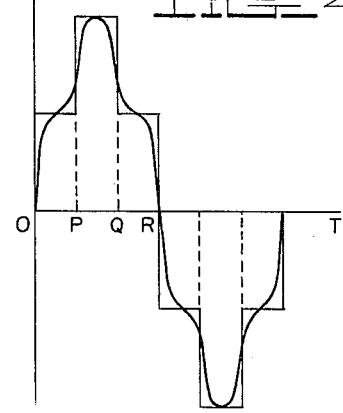
FIG-4
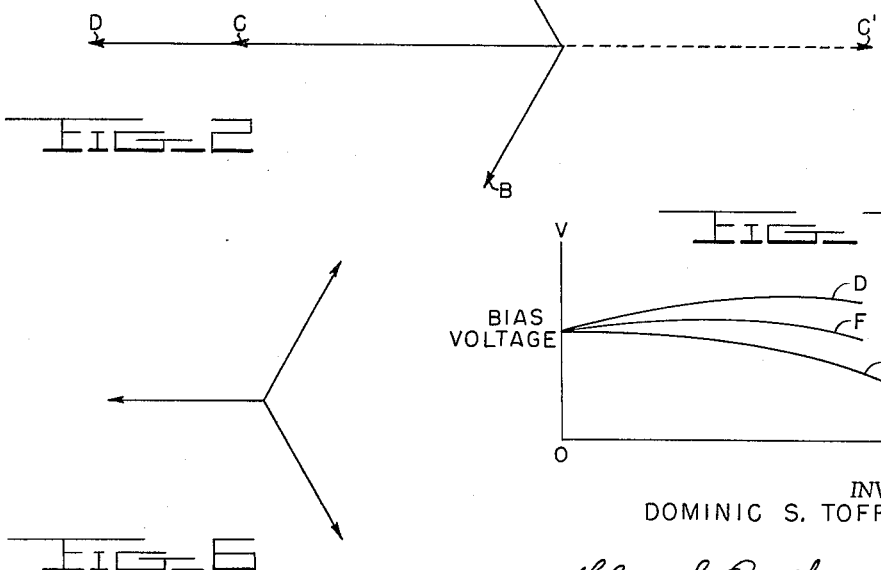
FIG-2
FIG-6
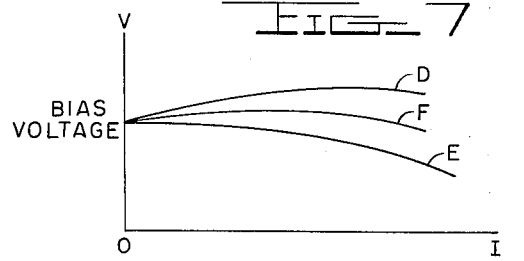
FIG-7
INVENTOR
DOMINIC S. TOFFOLO
BY
ATTORNEY

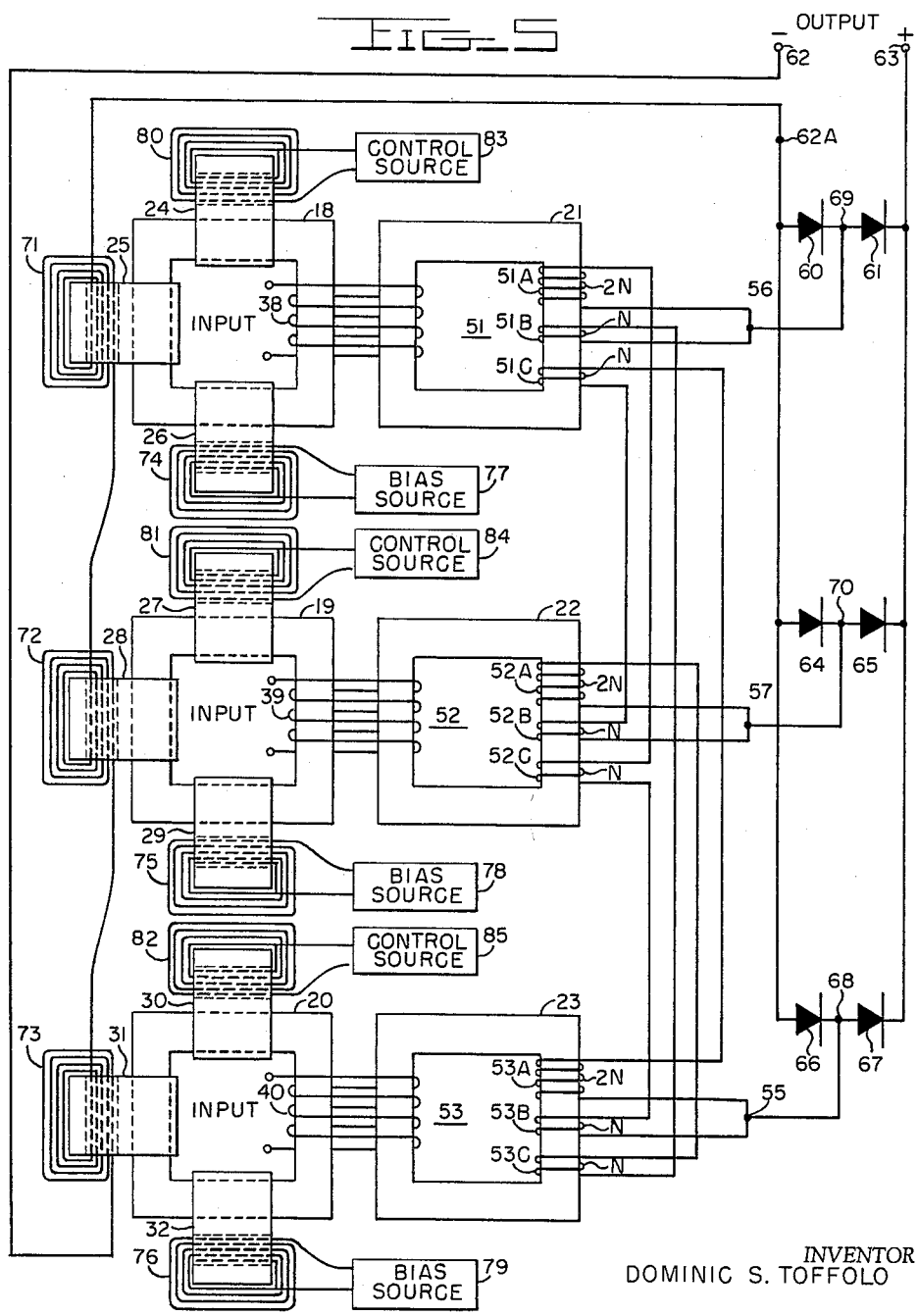

Oct. 15, 1963 D. S. TOFFOLO 3,107,325
REGULATED TRANSFORMER RECTIFIER POWER SUPPLY
Filed June 29, 1962 6 Sheets-Sheet 3

INVENTOR
DOMINIC S. TOFFOLO
BY *Glenn S. Orrick* Agent
*Richard C. Reid*
ATTORNEY

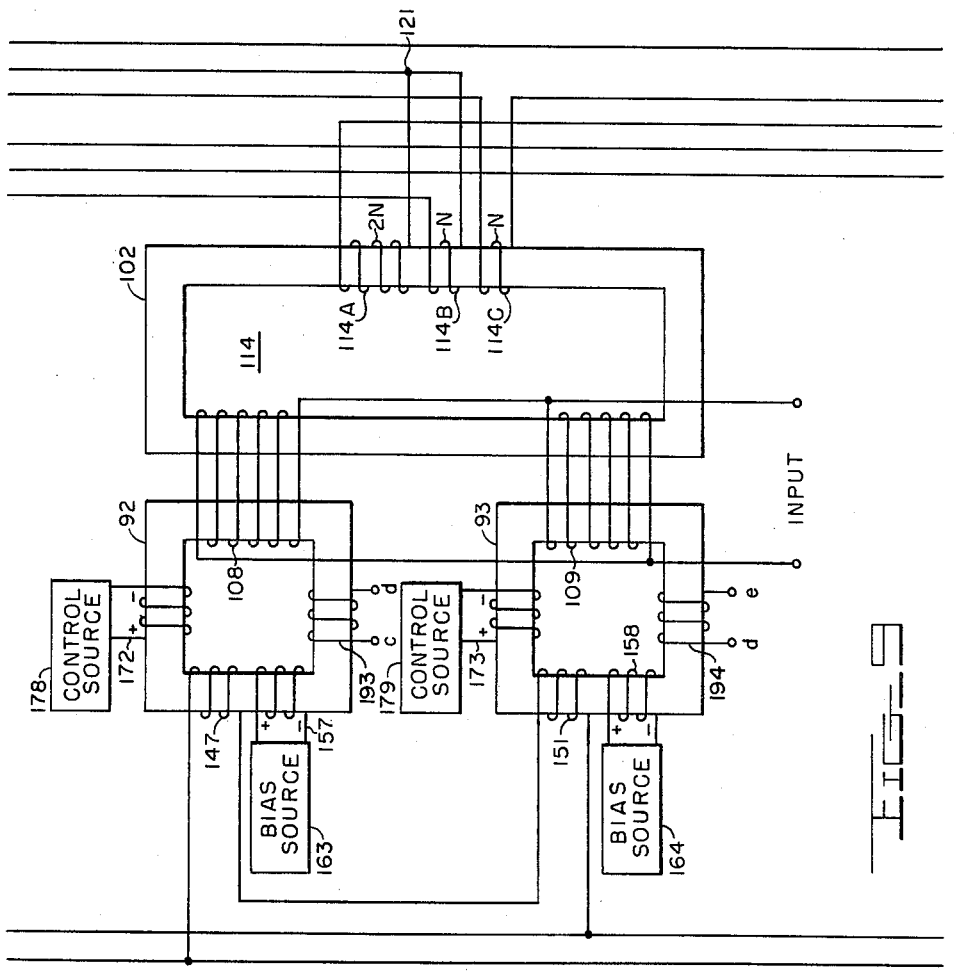

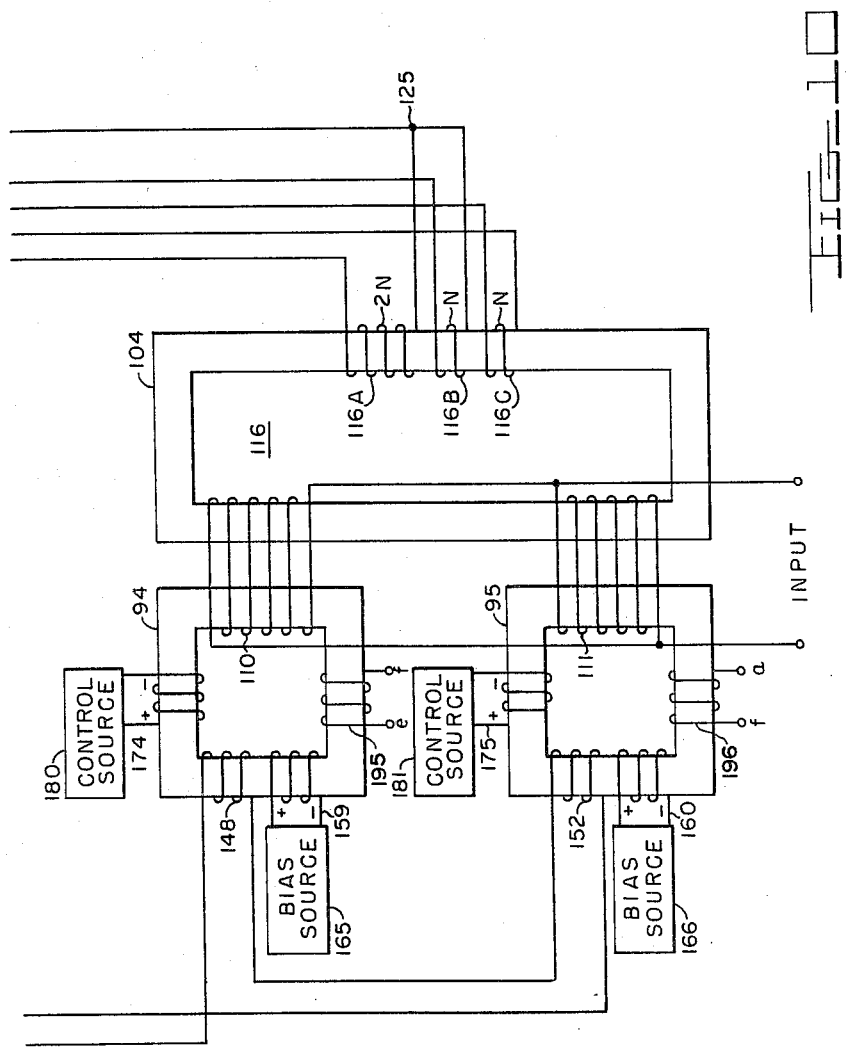

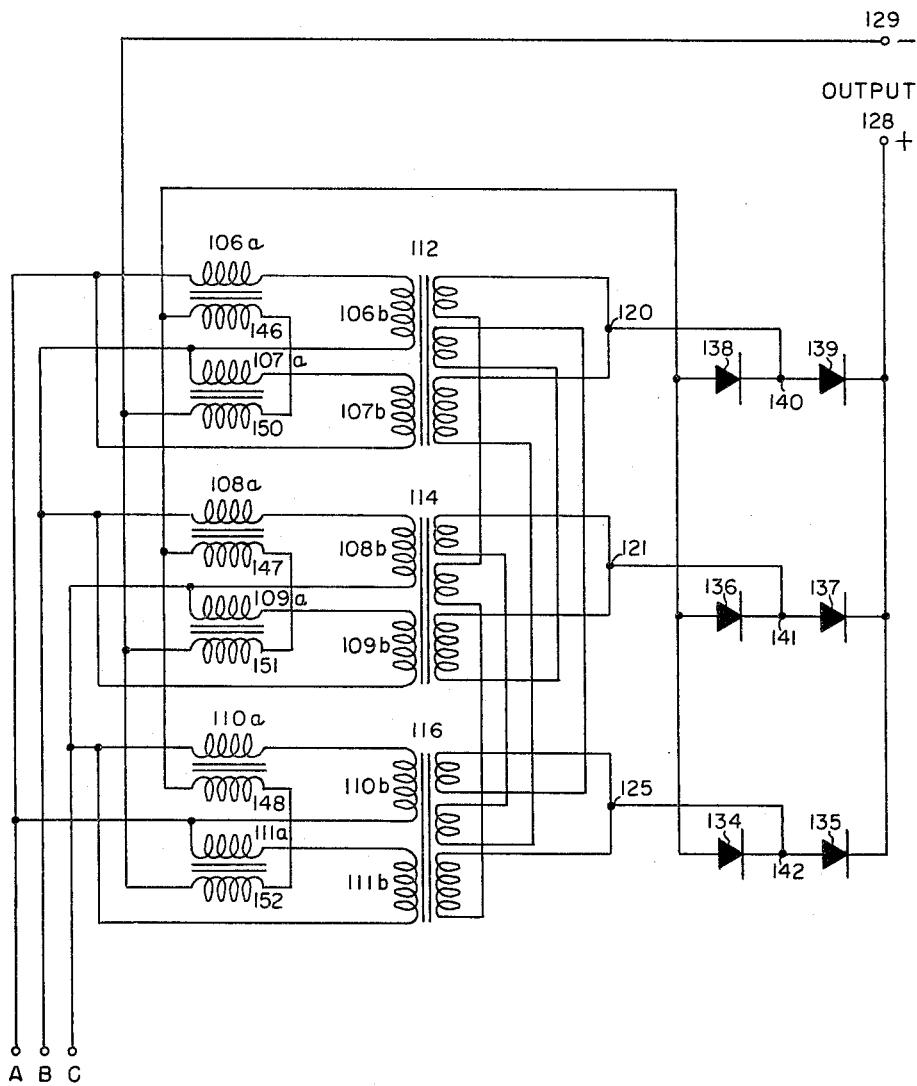

United States Patent Office 3,107,325
Patented Oct. 15, 1963

3,107,325
REGULATED TRANSFORMER RECTIFIER
POWER SUPPLY
Dominic S. Toffolo, Hillcrest Heights, Md., assignor to the United States of America as represented by the Secretary of the Navy
Filed June 29, 1962, Ser. No. 207,166
10 Claims. (Cl. 321—25)
(Granted under Title 35, U.S. Code (1952), sec. 266)

The invention described herein may be manufactured and used by or for the Government of the United States of America for governmental purposes without the payment of any royalties thereon or therefor.

This invention relates in general to high current signal converters and in particular to one providing a D.C. voltage output with a three-phase A.C. voltage input. The present invention is of the variety disclosed and claimed in my co-pending application Serial No. 848,173, filed Sept. 30, 1959, and represents an improvement thereover.

The device of this invention embodies the new concept for control of transformer rectifier D.C. power supplies first disclosed in the above said co-pending application.

As is well known in the art, prior art regulated transformer conversion units furnishing D.C. electric power from polyphase sources of A.C. power have an inherent non-linear input impedance per phase. That is to say, the primary current wave form in any given phase contains considerably more harmonics than the voltage wave form of the same phase. In general, this difference in wave forms is due primarily to two factors. The first is the action of the rectifier themselves. The rectifiers with the highest positive voltage are in the conducting stage: these block all other rectifiers tied to the positive D.C. buss. As a consequence, a rectifier in a three phase bridge system conducts over 60% of each half cycle. This type of current distortion exists for both regulated and non-regulated transformer rectifier D.C. power converters. The second is the gating of the voltage applied to the primary of the transformer or the gating of the secondary voltage supplying the rectifiers, either by means of "square loop" core reactors or by the use of controlled rectifiers connected to the D.C. buss. This type of current distortion exists especially in regulated transformer rectifier power supplies.

Current wave fault distortion can be tolerated by the power converter itself so that acceptable D.C. power can be produced. This distortion as far as the remainder of the system is concerned, can be tolerated also if the source of A.C. power has small internal synchronous impedances for the higher order harmonics of the current. For many applications the above criteria for the A.C. power supply are not satisfied. This is often the case in airborne A.C. generator systems or mobile units used in field applications.

The basic invention disclosed and claimed in the abovesaid co-pending application has effectively alleviated many of the problems of the prior art. For example, this basic invention has greatly reduced not only third order harmonic interference, but size and weight requirements as well. However, it is recognized that a greater reduction in size, weight and cost requirements is needed and would be welcomed as a substantial advancement of the art. Accordingly:

It is an object of this invention to provide a miniaturized regulated electrical energy conversion unit.

It is also an object of this invention to provide a lightweight regulated electrical energy conversion unit.

It is another object of this invention to provide a low cost regulated electrical energy conversion unit.

It is a further object of this invention to provide a simplified electrical energy conversion unit having a lesser number of component parts.

It is an additional object of this invention to provide a regulated electrical energy conversion unit including transformer sections which may be readily manufactured to exacting tolerances.

It is still another object of this invention to provide a regulated electrical energy conversion unit involving a grouping of several compact units which may be easily assembled and disassembled as required.

Other objects of the invention will become apparent upon a more comprehensive understanding of the invention for which reference is had to the following specifications and drawings wherein:

FIG. 1 shows a basic embodiment of a high current signal converter of the variety involved in the present invention.

FIG. 2 is a vector diagram of the voltage appearing across the output terminals of the high current signal converter shown in FIG. 1, and at selected points in the more complex signal converter of FIG. 5 and in the embodiments of the present invention shown in FIGS. 8 to 11.

FIGS. 3 and 4 are wave forms of signals that may appear across the output terminals of the high current signal converter shown in FIG. 1 and at selected points in the more complex signal converter of FIG. 5 and the embodiments of the invention shown in FIGS. 8 to 11.

Figure 5:
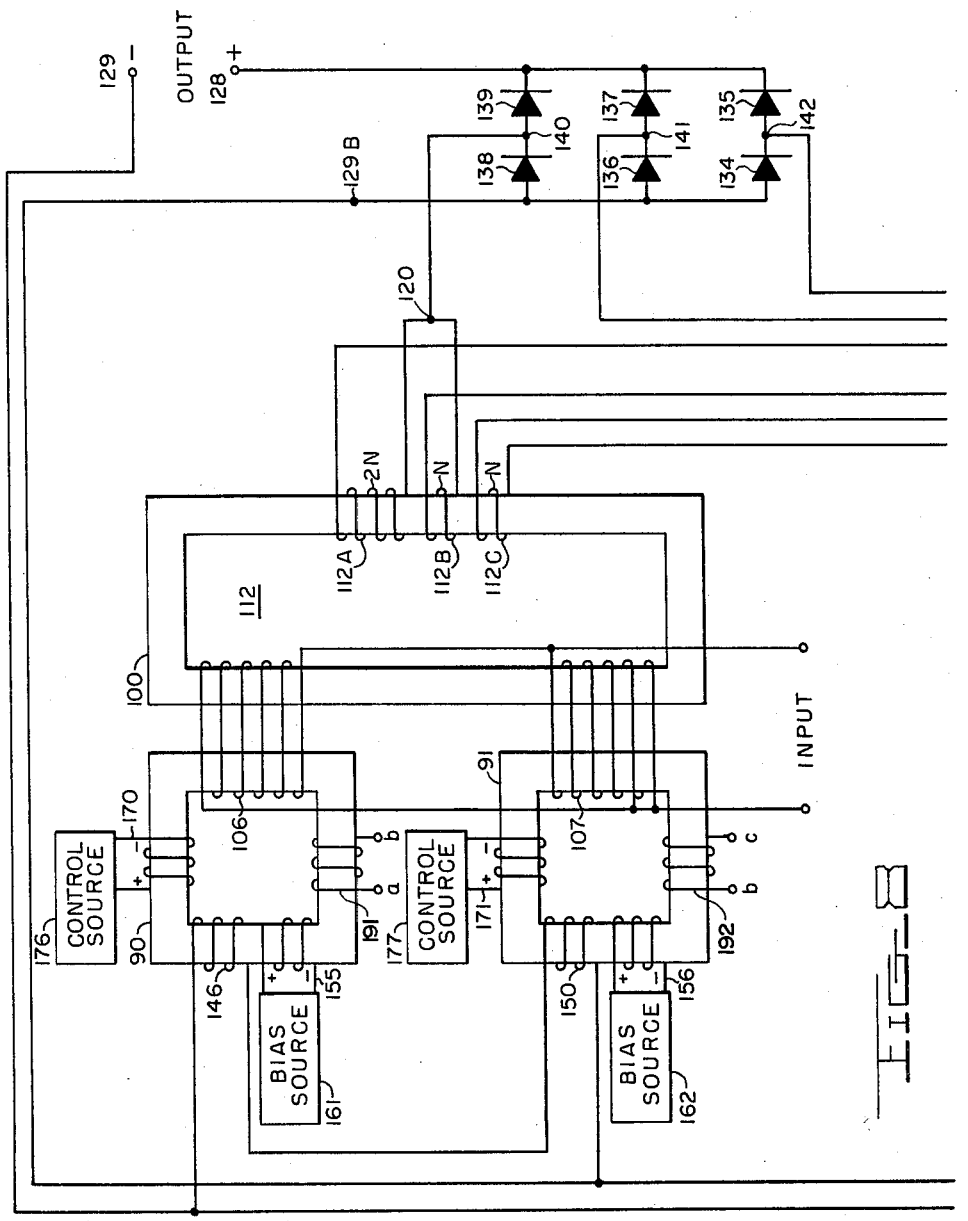

FIG. 5 discloses a more complex embodiment of a high current signal converter of the variety involved in the present invention.

FIG. 6 is a vector diagram of the voltage appearing across the output terminals of the more complex signal converter shown in FIG. 5 and in the embodiments of the invention shown in FIGS. 8 to 11.

FIG. 7 is a plot of output current versus voltage of the more complex signal converter shown in FIG. 5.

FIGS. 8 to 11 disclose a first selected embodiment of the present invention in pictorial schematic form.

FIGURE 11 discloses a second selected embodiment of the present invention in schematic form.

In accordance with the teaching of the present invention each phase of a polyphase signal activates a respective transformer section in proper sequence and the output is applied via novel synthetic secondary windings to a rectifier unit to provide a regulated D.C. voltage output. The individual transformer sections are substantially identical and, in a preferred embodiment, are adapted for "snap in" connection to enable simple replacement of defective elements, as necessary, without significant interruption of service.

In the selected embodiment of the invention, each secondary winding is provided with three coils, one having 2N turns, and two having N turns, where N is any selected number. From these coils three circuits are formed each including an N and 2N coil. Each coil is located in a different winding the 2N coil on each circuit is connected to have reverse polarity with respect to the others. When a three phase signal is applied to the primary windings each circuit provides a single phase signal so that the three circuits may be connected to provide a three phase signal without distorting the wave form applied to primaries.

Referring to FIG. 1, source of signals 7 provides a three phase signal, each phase of which is applied to a respective primary winding 8, 9 or 10 located on cores 11, 12 and 13. Secondary windings 14, 15 and 16 are wound in the same direction, windings 14 and 15 having N turns and winding 16 having 2N turns, as indicated in the drawing. The secondary windings are connected in series with resistor 17 in such a manner that the polarity of secondary winding 16 is reversed with respect to that of the others. It is understood, of course, that as many cores and windings as desired may be used, that the signal applied to the primary windings may have as many phases as desired, and the ratio between secondary turns may be other than as described herein.

Referring to FIG. 2, vectors A, B, and C represent the direction and magnitude of the voltages applied across resistor 17 by secondary windings 14, 15 and 16, respectively. Vector C' represents the direction and magnitude of the voltage that would have been applied by secondary winding 16 if the polarity of the winding were not reversed. It is noted that the resultant D has the same direction as vector C with an amplitude three times that of either vectors A or B and a three phase signal, applied to the primary windings 8 to 10, develops a single phase signal across resistor 17.

Referring to FIG. 3, if each of the secondary windings 14 to 16 had the same number of turns, the primary windings would successively draw three currents having the same magnitude during the time intervals OX, XY, and YZ forming a composite square wave signal. This would disturb the armature reaction voltage of a generator supplying current to the line and would have, in general, the same disadvantages as the earlier prior art. However, since secondary winding 16 has twice as many turns as the other secondary windings, the primary windings will draw the current having the magnitude indicated during intervals OP, PQ, QR, respectively, as shown in FIG. 4. The waveform developed approximates that of a sine wave and will not substantially affect the operation of a generator connected to the transformer and supplying the line current. It is understood, of course, that the greater number of phases employed the closer the composite wave will approach that of a sine wave.

Referring to FIG. 5, the energy conversion means disclosed therein employs a transformer having primary cores 18 to 20, secondary cores 21 to 23 and control cores 24 to 32. Each phase of a three phase signal may be applied to a respective one of the primary windings 38, 39 and 40 located on and linking cores 18 and 21, 19 and 22, and 20 and 23 respectively. The synthetic secondaries 51, 52 and 53 each comprise a group of three coils, i.e., secondary 51 includes coils 51A, 51B, and 51C; secondary 52, coils 52A, 52B, 52C; and secondary 53, coils 53A, 53B, and 53C. Each group has one coil having 2N turns and two coils having N turns, as indicated in the drawings, so that in secondary 51, coils 51B and 51C have N turns and coil 51A has 2N turns. Likewise, in secondary 52, coil 52A has 2N turns while coils 52B and 52C have N turns, and finally, in secondary 53, coil 53A has 2N turns and coils 53B and 53C have N turns. All the coils in the secondaries 51, 52 and 53 are wound in the same direction, and series circuits are formed by connecting an N, N and 2N coil, each from a respective secondary 51, 52 and 53, in series in such a manner that the 2N coil has reversed polarity with respect to the others. For example, coils 53B, 52C, and 51A are connected between points 55 and 56, coil 51A having 2N turns and reversed polarity with respect to coils 53B and 52C. Similarly, coils 53A, 51C, and 52B are connected between points 55 and 57; and coils 52A, 53C and 51B are connected between points 56 and 57, coils 53A and 52A having 2N turns and reversed polarity with respect to their associated coils.

Unilateral impedance devices 60 and 61 are connected in series and in the same polarity across terminals 62A and 63, and unilateral impedance devices 64 and 65 as well as unilateral impedance devices 66 and 67 are connected in the same manner to the same terminals. Points 55 to 57 are connected to points 68 to 70, respectively.

Considering the various windings positioned on the control cores 24 to 32, windings 71 to 73, located on control cores 25, 28 and 31, respectively, are connected in series between terminals 62 and 62A. Each winding 74 to 76 is positioned on a respective one of control cores 26, 29 and 32 and is connected across a respective bias source 77, 78 and 79. In a similar manner, each winding 80 to 82 is positioned on a respective one of control cores 26, 29 and 32 and is connected across a respective one of control sources 83, 84, and 85. Bias sources 77 to 79 and control sources 83 to 85 are D.C. sources of potential in this embodiment and in practice, for ease of control, the windings 74 to 76 may be connected in series and likewise the windings 80 to 82 may be connected in series.

The composition of primary cores 18 to 20, secondary cores 21 to 23, and control cores 24 to 32 as well as the various cores in FIGS. 1 and 9 to 11, depends to a large extent on the purpose for which the transformer is used and typically may be either solid or laminated structure. Primary cores 18 to 21, for example, may be laminated, grain oriented material. The characteristic of this material that makes the same particularly desirable in the present instance is the tremendous difference in permeability in the direction of grain orientation as compared to the permeability at right angles thereto. Thus, where permeabilities of the order of several thousand may be common in the grain oriented direction, which is that of flux produced by primary winding 38 in primary core 18, for example, transverse permeabilities of the order of several units will exist for the flux produced in the primary core by winding 71 and control core 25. Thus, even with material of high permeability for the control core, the primary core will provide a substantial reluctance to the total path for flux produced by winding 71.

It is further characteristic of grain oriented core material, that although the transverse permeability is very low compared to the oriented permeability, the percentage change in the permeability in the grain oriented direction will be substantially equal to the percentage change in the degree of saturation in the transverse direction. Thus, flux changes of several units in the transverse flux produced by winding 71 and control core 25, for example, will cause permeability changes of several thousand units in the oriented direction of primary core 18. This facilitates the control exerted by control cores 24 to 32, and their associated windings, over the flux distribution between primary cores 18 to 20 and secondary cores 21 to 23 and, consequently, the degree of coupling between primary windings 38 to 40 and secondary windings 51 to 53.

To illustrate the control exerted by transverse flux in primary cores 18 to 20, assume that substantially the same flux is produced in primary core 18 and secondary core 21 by primary winding 38 when the primary and secondary cores are identical and no addition flux is introduced in primary core. Such a condition will produce a selected degree of coupling between primary winding 38 and secondary winding 51 inducing a selected output voltage in the latter. If the flux in primary core 18 is removed or blocked, that is, the impedance of the primary core is increased by some suitable means without changing the excitation current applied to primary winding 38, the amount of flux in secondary core 21 will be increased. This effectively increases the coupling between primary winding 38 and secondary winding 51 so that an increased output voltage will result from the same excitation voltage applied to the primary winding.

The transverse flux produced in primary core 18 by windings 71, 74 and 80 controls the degree of saturation of the core in the transverse direction, which determines in part the impedance of the primary core to flux presented by primary winding 38. Thus, by changing the amount of current flowing in windings 71, 74 and 80 the impedance of primary core 18 can be controlled and, consequently, the flux distribution can be varied from a condition in which equal flux division is obtained between primary core 18 and secondary core 21 to a condition of effective saturation of the primary core when flux from primary winding 38 is concentrated in the secondary core.

It is apparent that the above relationships also exist between primary core 19 and secondary core 22 and between primary core 20 and secondary core 23 and their associated windings.

In the operation of the embodiment shown in FIG. 5 an appropriate D.C. bias is applied by bias sources 77 to 79 and windings 74 to 76 to primary cores 18 to 20 providing operation about a desired point on the B-H curve. The output of control sources 83 to 85, applied to windings 80 to 82, determines in part the permeability of the primary cores by regulating the flux distribution between primary cores 18 to 20 and secondary cores 21 to 23. When each phase of a three phase signal is applied to a respective one of the primary windings 38 to 40, coils 53B, 52C and 51A, connected in series between points 55 and 56, provide a signal having the waveform shown in FIG. 4 and the vector relationship shown in FIG. 2. Similar waveforms and vectors are provided by coils 53, 51C, and 52B and coils, 52A and 53C and 51B. Because the vectors provided are displaced by 120 degrees, the signal appearing at points 55 to 57 and applied to unilateral impedance devices 61, 65, and 67 has the vector diagram shown in FIG. 6. The unilateral impedance device, having the highest positive potential applied thereto at any one incident of time will conduct, applying a positive potential to output terminal 63 and a blocking potential on the anodes of the other unilateral impedance devices. As is apparent each set of unilateral impedance devices 60 and 61, 64 and 65, 66 and 67 conducts during one third of the period of operation and when conducting draws current from all three secondary windings 51 to 53 so that the unilateral impedance devices appear to be a three phase load to primary windings 38 to 40. Since each secondary winding 51 to 53 continually draws current and the total current provided by each secondary winding over a period of operation is the same, the line current remains balanced and detrimental transients, due to intermittent operation, are avoided.

When current flows in secondary windings 51 to 53, a C.M.M.F. established in secondary cores 21 to 23 would ordinarily disturb the distribution of flux established by bias sources 77 to 79 and control sources 83 to 85. However, line current, flowing through terminals 62, 62A and windings 71 to 73, increases the impedance of the primary cores 18 to 20 and thereby increases the flux in secondary cores 21 to 23. Since the same current flows through secondary windings 51 to 53 as windings 71 to 73, the M.M.F. forcing the flux from primary cores 18 to 20 to secondary cores 21 to 23 will equal and balance out the C.M.M.F. established in the secondary cores by current flow through the secondary windings.

The action that occurs is similar to that of a compounded D.C. generator with a series field, so that depending upon the number of turns employed in windings 71 to 73, the voltage-current characteristic may be over, under or flat compounded, as shown by curves D, E, and F, respectively, in FIG. 7. The number of turns employed in the windings are selected to obtain a desired voltage-current characteristic.

In a specific example of operation, assume windings 71 to 73 are selected to provide flat compounding, and the voltage applied to the primary windings 38 to 40 is between 105 to 130 volts. If it is desired to maintain the voltage on output terminals 62 and 63 at 120 volts, control sources 83 to 85 are adjusted to provide a 40 to 60 flux distribution between primary cores 18 to 20 and secondary cores 21 to 23. If the voltage on terminals 62 and 63 is below 120 volts, the potential is brought up to the desired value by adjusting control sources 83 to 85, i.e., controlling the flux distribution between primary and secondary cores. If, on the other hand, the output voltage is above 120 volts, the potential is brought down to the desired value by adjusting bias sources 77 to 79, i.e., varying the point of operation on the B-H curve. Using this technique, a substantially uniform output voltage may be obtained over a wide variation in voltage applied to primary windings 38 to 40.

Referring now to the first selected embodiment of the present invention, as depicted in FIGS. 8 to 10, primary cores 90 and 91 are coupled by input windings 106 and 107, respectively, to secondary core 100, primary cores 92 and 93 are coupled by input windings 108 and 109, respectively, to secondary core 102 and primary cores 94 and 95 are coupled by windings input 110 and 111, respectively, to secondary core 104.

In accordance with the invention, the multiphase input, in this case a three phase signal, is applied to the input windings 106 to 111 in such a manner that the first phase is applied in parallel to the windings 106 and 107, the second phase is applied to the windings 108 and 109 and the third phase is applied to the windings 110 and 111. Each input winding in each transformer section is adapted to provide a flux which aids that produced by the other input winding in the secondary core and to produce a flux in each respective primary core of reference direction.

The bias winding and the control winding of each respective primary core 146 and 170, 150 and 171, 157 and 172, 151 and 173, 159 and 174 and, 160 and 175 are adapted (normally in opposition) to produce a resultant flux level of selected direction in each primary core.

D.C. series compensation windings 146 and 150, 147 and 151; and 148 and 152 are connected in series parallel arrangement to provide a flux of selected direction in each respective primary core such that the selected direction of the flux produced by the series compensation winding and the selected direction of the resultant flux produced by the bias and control winding in each primary core are in aiding relation and the selected direction of the combined flux produced thereby in one primary core is in aiding relation with respect to the flux produced by its respective input winding and the selected direction of the combined flux produced thereby in the other primary core of each transformer section is in opposition to the flux produced by its respective input winding.

Windings 191 through 196 are serially connected in a loop with each winding on a respective primary core as a closed polyphase tertiary circuit to eliminate rectifier spikes on the D.C. bus. The serial connections are made through terminals *a*, *b*, *c*, *d*, *e*, and *f* as shown in FIGS. 8–10.

It will be appreciated that the synthetic secondaries 112, 114, and 116 together with the rectifier unit comprising rectifiers 134 through 139 are substantially similar to the synthetic secondaries 51, 52 and 53 together with the rectifier unit comprising rectifiers 60 through 67 as previously referred to in the discussions of FIG. 5 and that these synthetic secondaries and rectifier units function in a comparable manner.

In the operation of the embodiment shown in FIGS. 8 to 10, current flowing in bias windings 155 and 156 produces flux in a selected direction in primary cores 90 and 91 respectively. When a positive signal is applied in parallel to input windings 106 and 107, the flux established thereby in primary core 90 will aid that caused by bias winding 155 and the flux established thereby in primary core 91 will oppose that established by winding 156. When on the next half cycle, a negative signal is applied to the same input windings, the relationships are reversed so that the flux set up by winding 155 will be opposed and that set up by winding 156 will be aided by the flux attributed to the negative signal. Because similar relationships exist between the flux established in primary cores 92 and 93, likewise primary cores 94 and 95, appropriate bias applied to the primary cores by bias sources 161 to 166 and windings 155 to 160 may, as in the embodiment shown in FIG. 5, provide operation about a desired point on the B-H curve; and the output of each control source 176 to 181 may effect a desired flux distribution between each group of primary cores and their respective secondary core.

In the three phase embodiment of FIGS. 8 through 10 and the embodiment of FIG. 5 as well, with fixed primary voltage and with three windings of N, N and 2N turns on each secondary core, the secondary voltage is proportional to 3N. As previously discussed in connection with the embodiment of FIG. 5, the secondary voltage is taken across each of the series connections comprising an inverted 2N winding from one phase and an N winding from each of the other phases. It will be noted that the synthetic secondary of the device of this invention requires a ⅓ increase in secondary copper compared with a conventional three phase secondary system. It has been found, however, that the disadvantage of an increase in secondary copper, is readily offset by the regulated output advantage obtained.

In particular, it has been found that the flow of primary current contains fewer harmonics in the device of this invention.

This is particularly significant, of course, because the flow of primary current through the primary core gives rise to control problems in proportion to the harmonic content of the current waveform. It has been found that by increasing the magnitude of the energizing currents the harmonic content of the current waveform can be even further decreased. It will be appreciated that in the embodiment of FIGS. 8 through 10 the flow of energizing current is for the full $2\pi$ degrees of the cycle.

It has been found that embodiment of FIGURES 8 to 10 may be reduced to a basic transformer rectifier design without additional control means and that the balance condition in the rectifier output is highly satisfactory for most applications. In such instance, the synthetic secondary arrangement serves to greatly reduce the transient "voltage spikes" and to correspondingly reduce the regulation problem.

It will be appreciated, of course, that for optimum performance, the average transformer-rectifier assembly may require compensation means for alleviating various design deficiencies as may exist in selected standardized items.

It has been found that the basic transformer rectifier design may exhibit a drooping voltage characteristic as resistive load is connected to the load terminals even though the primary voltage is held constant. Thus to maintain a ±1% D.C. bus voltage regulation, for example, an appropriate control system may be an additional requirement. The control system described and shown in the embodiments of FIG. 5 and FIGURES 8 through 10 is essentially that of matching the reactance of the primary core to the load current by means of the compensation winding so that the impedance of the primary core is a suitable function of the load current. It will be seen that the function is such that with load current flowing, the phasor sum of the voltage across the primary core and the voltage across the secondary core is equal to the input terminal voltage. In the illustrated embodiments, a D.C. winding in series with the D.C. bus is wound around the primary cores of all phases. Under balanced primary voltage input, no A.C. voltages is induced due to the linkage of the D.C. winding with both primary cores in each tansformer section because in the three phase system as shown the induced voltages in the D.C. series winding will cancel.

As the transformer is loaded, the flux produced by the D.C. series winding will oppose the flux produced by the input winding on one of the primary cores and the flux produced by the respective D.C. series winding will aid the flux produced by the input winding on the other primary core for the first half of the cycle and vice versa for the second half. This control action is symmetrical over the full cycle as far as the ampere turns energizing the transformer core is concerned. The net effect, due to the saturation characteristic of the core material, is to increase the sum of the voltages appearing across the secondary windings on the secondary core of the transformer sections. In order to make this increase just equal all the voltage drops (due to the load) in the transformer plus the increase in voltage drop across the rectifiers and one D.C. series winding, the shape of the operating saturation curve of the primary cores must be properly determined. This may be done, for example, by changing an effective air gap in the primary core either by the manner in which the core laminations are stacked or—in some cases—adjusting the magnitude of the air gap by the insertion of suitably dimensioned nonmagnetic material. A further adjustment or shaping can be accomplished by manipulating the leakage paths so that the actual physical placement of the primary cores with respect to each other and with respect to the secondary core is effective in bringing about the desired regulation. This type of control will increase the no load energizing current but this can be accommodated from an efficiency point of view by slightly increasing the conductor size of the input windings in each transformer section and the D.C. series winding on the primary cores. It will be seen that the D.C. series winding also makes it simple to operate many units in parallel, even units of different power ratings.

Basically, the device of this invention is intended for operation wherein the primary current contains no harmonics. In general practice however, some harmonics, in particular a third and sixth harmonic, are present and it is advisable to reduce the impedance of the primary core to the flow of this harmonic current. This may be accomplished by placing a tertiary winding on the primary cores all in the same winding sense as the D.C. series winding and closed upon itself. It has been found that this tertiary winding not only serves to reduce the sixth harmonic impedance, it reduces the response time on the D.C. bus voltage to instantaneous load charges, as well. In the embodiment of FIGS. 8 through 10, the problem of maintaining the desired D.C. voltage regulation when the A.C. input voltage varies within specified limits presents an added requirement which generally necessitates an increase in the size of the primary cores as compared to the secondary cores. In general, with a fixed nominal voltage rating, the size of the primary cores will be larger, percentage-wise, as the power rating of the unit goes up and as the allowable input voltage swing gets wider. To achieve the desired regulation without feedback, two separate windings, similar to the D.C. series winding, may be wound, as shown in the embodiments of FIG. 5 and FIGS. 8 through 10, on the reactor cores and these windings are, with respect to themselves, of opposite sense, i.e., their ampere turns are opposed to each other. One winding, the bias winding, may be connected to a first D.C. source and the other winding, the control winding, is connected to a second D.C. source as shown, if desired.

Generally, the bias winding M.M.F. is in the same direction as the D.C. series winding. If required, one can further adjust the D.C. bus voltage level by supplying the bias winding from a three phase variable autotransformer, not shown. The amount of voltage adjustment desired in this fashion will again have a bearing on the size of the primary cores. With the A.C. input voltage at its lowest level, the current in the bias windings may be adjusted by means of the variable autotransformer until the open circuit voltage on the D.C. bus is at its lowest specified level. The turns on the "square loop" primary cores in the control winding circuit are then adjusted so that the primary core just saturates (operates knee-to-knee) at that A.C. input voltage. As the A.C. input voltage increases, the core saturates sooner in the cycle and thus output current flows. This "turn-on" point can be found experimentally as is sometimes necessary. The impedance of the control winding is then adjusted so that at the highest A.C. input voltage the control winding and the bias winding balance. To increase the D.C. voltage, the A.C. voltage supplying the bias winding circuit is increased to the desired point. As the input winding voltage reaches its maximum allowable level, the control winding cannot cancel all of the effect of the bias winding and the net remaining effect keeps the D.C. bus level at the desired elevated level. It will be appreciated that these windings also eliminate the undesirable third harmonic in the primary core.

It has been found that the device of this invention can be particularly effective when the primary cores and the secondary core are of the same material and are fabricated in a comparable manner such that the open circuit (no load on the D.C. bus) flux density of these cores is the same. It will be seen that this facilitates simple calculation of optimum operating flux densities in the device of this invention.

FIG. 11 depicts a second selected embodiment of the device of this invention substantially similar to the first selected embodiment as depicted in more detail in FIGURES 8 to 10. It will be noted that this embodiment incorporates a plurality of divided input windings and an improved series compensation winding energization arrangement. It is understood, of course, that the bias winding and control windings are deleted from the showing of FIG. 11 merely in the interest of a clear presentation of the invention and that it is within the purview of this disclosure to incorporate these windings in the manner shown in the embodiment of FIGS. 8 to 10, if the advantage obtained thereby is desired. It is not, however, essential to the useful operation of this embodiment of the invention that the bias and control means be incorporated.

In FIG. 11 input windings 106, 107, 108, 109, 110 and 111 each comprise two portions A and B with each portion wound on a respective primary or secondary core. It will be appreciated that by division of each input winding, the primary core assembly and the secondary core assembly may be individually manufactured, with accompanying convenience and economy, to greater accuracy requirements. Further, it will be appreciated that the breakdown of each transformer section into component assemblies enables greater utilization of an interchangeability feature of the device of this invention. That is, maintenance, repair and spare parts inventory costs may be substantially reduced.

The selected embodiment of FIG. 11 also incorporated a balanced series compensation winding feature wherein the two series compensation windings of each transformer section are connected in series parallel arrangement to facilitate the same degree of compensation due to output current on both positive and negative half cycles. It is understood, of course, that other series parallel arrangements might be employed, if desired.

The device of this invention provides a controllable D.C. bus voltage at ±1% regulation with as great as ±10% variation in applied A.C. input voltage. This is provided without a reference voltage comparison to the D.C. bus voltage and without feedback control power of any kind. Moreover, the device of this invention is aptly suited to further refinement in accordance with standard techniques because the time constant of the feedback circuit can be long which decreases the steady state error.

Further, it will be appreciated that the ferromagnetic primary cores may be constructed of material having a substantially rectangular hysteresis loop characteristic if a greater reduction of weight and or any other advantage obtainable thereby is desired.

It is understood, of course, that the foregoing disclosure is specifically directed to selected embodiments which are preferred for some applications thereof and that it is intended to cover all modifications and changes of the embodiments disclosed which do not depart from the spirit and scope of the invention.

What is claimed is:

1. A power conversion means for use with three phase A.C. systems comprising a plurality of three transformer sections, each of said transformer sections comprising first, second and third cores of ferromagnetic material, each of said transformer sections including a first input winding inductively associated with said first and third cores and adapted to produce a magnetic field having a selected reference direction in each of said first and third cores in response to current flow in a selected direction through said first input winding, and a second input winding inductively associated with said second and third cores and adapted to produce a magnetic field in each of said second and third cores in response to current flow in a selected direction through said second input winding such that said magnetic fields produced in said third core are in aiding relation; means for connecting each respective grouping of first and second input windings to a three phase voltage source such that each respective grouping thereof is energized by maximum current flow in successive order; at least one rectifier means including three similarly polarized unidirectional means connected in parallel, each of said unidirectonal means comprising a pair of serially connected unidirectional elements, a pair of output terminals and means for connecting the output of said rectifier means across said pair of output terminals, a plurality of three synthetic secondary windings each having three portions in 2N, N, N inductive relation, where N is a constant, each of said synthetic secondary windings having a different one of said portions thereof on each of said third cores of said three transformer sections with the 2N portion of each synthetic secondary winding on a different one of said third cores, each of said portions of said synthetic secondary windings being wound on its respective third core to produce a magnetic field of opposite direction with respect to said selected reference direction of the magnetic field produced by its respective input windings, means connecting said synthetic secondary windings in a delta arrangement having three terminal connections, and means connecting said delta arrangement of synthetic secondary winding to said rectifier means such that each of said three terminal connections is connected to a respective unidirectional means at the common connection of said unidirectional elements, said means for connecting the output of said rectifier means across said output terminals including in series therewith a plurality of 6 compensation windings each inductively associated with respective first and second cores of said transformer sections and adapted to produce a magnetic field in aiding relation and in opposing relation with respect to the magnetic fields produced by said input windings in said first and second cores, respectively, of each transformer section.

2. A power conversion means as defined in claim 1 wherein said plurality of compensation windings are grouped in pairs in series parallel connection and each pair is associated with a respective transformer section.

3. A power conversion means as defined in claim 1 wherein at least one biasing means is inductively associated with each of said first and second cores in said transformer sections for establishing a selected flux condition therein.

4. A power conversion means as defined in claim 3 wherein means are provided for varying the flux level established by said biasing means.

5. A power conversion means as defined in claim 2 wherein at least one biasing means is inductively associated with each of said first and second cores in said transformer sections for establishing a selected flux condition therein.

6. A power conversion means as defined in claim 5 wherein means are provided for varying the flux level established by said biasing means.

7. A power conversion means as defined in claim 1 wherein a plurality of six tertiary winding means are electrically connected in a loop and are inductively associated with respective first and second cores to reduce the impedance of said first and second cores to the flow of sixth harmonic current.

8. A power conversion means as defined in claim 2 wherein a plurality of six tertiary winding means are electrically connected in a loop and are inductively associated with respective first and second cores to reduce the impedance of said first and second cores to the flow of sixth harmonic current.

9. A power conversion means as defined in claim 1 wherein said first and second input windings each comprise two winding portions in series connection with each winding portion inductively associated with a respective one of said cores.

10. A power conversion means as defined in claim 2 wherein said first and second input windings each comprise two winding portions in series connection with each winding portion inductively associated with a respective one of said cores.

References Cited in the file of this patent

UNITED STATES PATENTS

| | | |
|---|---|---|
| 2,628,340 | Potter | Feb. 10, 1953 |
| 2,860,299 | Pomazal | Nov. 11, 1958 |